United States Patent [19]  [11] 4,385,130
Molinski et al.  [45] May 24, 1983

[54] ION EXCHANGE RESINS

[75] Inventors: Tadeusz F. Molinski, Collingwood; Michael V. Markus, East Malvern, both of Australia

[73] Assignee: ICI Australia Limited, Melbourne, Australia

[21] Appl. No.: 216,676

[22] Filed: Dec. 15, 1980

[30] Foreign Application Priority Data

Dec. 28, 1979 [AU] Australia ............................ PE1846

[51] Int. Cl.$^3$ ............................................ C08F 259/08
[52] U.S. Cl. .................................... 521/31; 204/159.17
[58] Field of Search ...................... 521/31; 204/159.17

[56] References Cited

U.S. PATENT DOCUMENTS

| | | | |
|---|---|---|---|
| 2,636,851 | 4/1953 | Juda | 204/98 |
| 2,967,807 | 1/1961 | Osborne | 204/98 |
| 3,017,338 | 1/1963 | Butler | 204/98 |
| 3,143,521 | 8/1964 | Thompson | 204/159.17 |
| 3,282,875 | 11/1966 | Connolly | 260/29.6 |
| 3,496,077 | 2/1970 | Cooper | 204/98 |
| 3,560,568 | 2/1971 | Resnick | 260/513 |
| 3,666,693 | 5/1972 | Chapiro | 204/159.17 |

FOREIGN PATENT DOCUMENTS 1184321 of 0000 United Kingdom .

OTHER PUBLICATIONS

Tevlina et al., "Preparation and Properties of Homogeneous Cation Exchange Membranes with Comples-Forming Groups", Intl. Polymer Science and Technology, vol. 4, No. 4, 1977.

Primary Examiner—Joseph L. Schofer
Assistant Examiner—Peter F. Kulkosky
Attorney, Agent, or Firm—Cushman, Darby & Cushman

[57] ABSTRACT

A cation exchange resin, suitable for use as a membrane in electrolysis cells, comprising a perhalogenated fluorine containing hydrocarbon polymeric substrate with pendant active side chains containing dicarboxylic acid groups or their derivatives, and method of preparation thereof.

25 Claims, No Drawings

ION EXCHANGE RESINS

The present invention relates to novel cation exchange resins, their preparation and their use; in particular it relates to cation exchange materials suitable for use as permeselective membranes in electrolytic cells such as are used in the manufacture of alkali metal hydroxide solutions and chlorine.

Alkali metal hydroxide solutions and chlorine are generally manufactured in mercury cells or diaphragm cells. Mercury cells have the advantage of producing concentrated alkali metal hydroxide solutions but give rise to problems associated with the disposal of mercury-containing effluents. On the other hand, diaphragm cells, in which the anodes and cathodes are separated by porous diaphragms which permit the passage of both positive and negative ions and of electrolyte, avoid the aforesaid effluent problem, but have the disadvantage that (1) relatively weak impure alkali metal hydroxide solutions are produced, which results in increased evaporation costs, and (2) there is a possibility of product gases, namely hydrogen and chlorine, becoming mixed.

Attempts have been made to overcome disadvantages of both mercury cells and diaphragm cells by the use of cells in which the anodes and cathodes are separated by cation-active permselective membranes; these are membrances which are selectively permeable so as to allow the passage of only positively charged ions and not the passage of bulk electrolyte. Cation-active perm-selective membranes which are suitable for this use in chlorine cells include, for example, those made of synthetic organic copolymeric material containing cation-exchange groups, for example sulphonate, carboxylate and phosphonate.

In particular, synthetic fluoropolymers which will withstand cell conditions for long periods of time are useful, for example the perfluorosulphonic acid membranes manufactured and sold by E I DuPont de Nemours and Company under the trade mark 'NAFION' and which are based upon hydrolysed copolymers of perfluorinated hydrocarbons (for example polytetrafluoroethylene) and fluorosulphonated perfluorovinyl ethers. Such membranes are described for example in U.S. Pat. Nos. 2,636,851; 3,017,338; 3,496,077; 3,560,568; 2,967,807; 3,282,875 and U.K. Pat. No. 1,184,321.

The active sites in the molecular structure of the resins from which these membranes are made are provided by the fluorosulphonated perfluorovinyl ether component. These sites are present on side chains attached by an ether linkage to the skeletal structure of the resin.

However such membranes have a limited operating life at high caustic concentrations because of water uptake producing swelling and degradation of the membrane. This water uptake is related to the number and type of active sites in the molecular structure.

The membranes could be improved by the replacement of the active sites by ones having higher individual capacities, for example, replacement by dicarboxylic acid sites which have double the capacity of the sulphonic acid sites.

The preparation of cation exchange membranes containing dicarboxylic acid groups is described in Plasticheskie Massy 1976, 1, p 49. In this paper it is alleged that they are made by the graft copolymerisation (sic) of, for example, a mixture of maleic acid and styrene with a copolymer of hexafluoropropylene and vinylidene fluoride which copolymer provides the skeletal structure. The graft copolymerisation is effected by a radical-type initiator such as benzoyl peroxide. The reaction conditions described would indicate that rather than graft copolymerisation (as defined in "Organic Chemistry of Synthetic High Polyners" by R W Lenz Interscience Publishers 1967 page 251) taking place in fact an inter-penetrating polymer network (IPPN) is more likely to be formed. However, even if graft polymerisation does occur under the stated conditions, because the reaction is radical initiated, the molecular structure of the skeletal backbone on to which the grafting occurs has to contain hydrogen atoms or double bonds.

It is advantageous for the skeletal structure of cation exchange resins which are to be used in membranes in electrolytic cells to be free of hydrogen atoms and double bonds and to be fully halogenated, ie perhalogenated, because these are the most stable resins under the rigorous operating conditions of an electrolytic cell. Heretofore it has not been possible to prepare cationic ion exchange resins, suitable for use as membranes, which comprise a skeletal structure of a perhalogenated fluorine-containing hydrocarbon polymer and, as active side chains, chains containing dicarboxylic acid groups.

We have now found a process for preparing resins in which the perhalogenated skeletal structure does not contain any active groups, its functions being to provide a polymeric skeletal substrate to which active side chains containing dicarboxylic acid groups and/or their derivatives are attached. Heretofore an ion exchange resin with a support structure of a perhalogenated fluorine containing hydrocarbon polymer with dicarboxylic acid groups present to provide the active exchange sites has not been known.

Accordingly the present invention provides a novel cation exchange resin having a molecular structure comprising an inactive, as hereinafter defined, perhalogenated fluorine-containing hydrocarbon polymeric skeletal substrate with at least one attached active, as hereinafter defined, pendant side chain, said side chain comprising at least one active group derived from unsaturated dicarboxylic acids or derivatives thereof and at least one vinyl group derived from a vinyl monomer wherein said side chain is linked to the said substrate by at least one said vinyl group and wherein the molar ratio of said active groups to vinyl groups in said side chain is in the range of 1:1 to 1:20.

Preferably the molar ratio of the active groups to vinyl groups is in the range of 1:1 to 1:3.

By 'inactive' in the context of the description of the substrate we mean that the polymeric substrate structure does not contain any ion exchange groups. This has the advantage that the substrate possesses the desirable physical properties of stability and low water uptake typical of an unsubstituted fluorine containing hydrocarbon homopolymer.

By 'active' in the context of the description of the side chains we mean that the side chains contain groups which have, or can be converted to those having, cation exchange properties, in particular we refer to dicarboxylic acids and derivatives thereof.

The perhalogenated polymeric substrate may be perfluorinated or partly fluorinated. The preferred fluorine containing hydrocarbon substrate is a homopolymer or copolymer of fluorinated ethylene, especially a homopolymer or copolymer of tetrafluoroethylene or chlorotrifluoroethylene.

The side chains in the molecular structure of the resins of the present invention comprise active and linking vinyl groups, and therefore the active and linking vinyl groups are cografted.

The active groups are those represented by the general formula:

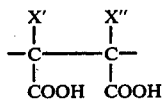

Where X' and X" may be the same or different and they represent hydrogen, fluorine, chlorine, alkyl group, halogenated alkyl group or a double bond.

Such groups are derived from monomers such as amides, anhydrides, acids, esters and salts.

The active groups are preferably derived from monomers such as maleic anhydride, 1,2-difluoromaleic anhydride and acetylenedicarboxylic acid and their derivatives.

The linking groups used in the products of the invention are those derived from both aliphatic and aromatic vinyl monomers. Suitable aliphatic vinyl monomers are, for example, those having the following general formula

whilst suitable aromatic monomers are, for example, those having the following general formula

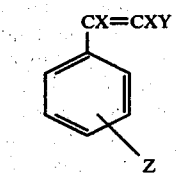

Where in the aforementioned aliphatic and aromatic monomers

X = hydrogen or fluorine
Y = hydrogen, fluorine or chlorine
Z = hydrogen, alkyl, alkene, halogenated alkyl or halogenated alkene group The preferred monomers to provide the linking groups are styrene and its halogenated derivatives, such as α,β,β-trifluorostyrene; divinylbenzene and its halogenated derivatives, such as α,β,β,α',β',β'-hexafluorodivinylbenzene; and ethylene and its halogenated derivatives such as tetrafluoroethylene.

Further suitable aromatic vinyl monomers are analogues of the aforesaid monomers having halogen atoms and/or functional groups, such as sulphonate and monocarboxylic groups, attached to the aromatic ring.

The molecular structures of one type of the side chains of the resins of the present invention may be represented diagrammatically as follows

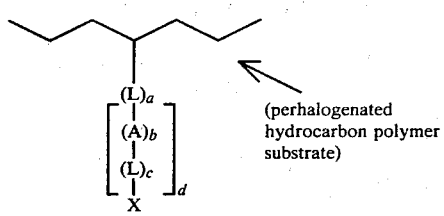

When
L = linking vinyl group
A = active group
X = polymer chain terminating group or fluorinated hydrocarbon polymer substrate
a = one or more
b = one or more
c = zero, one or more
d = one or more It will be appreciated that this representation does not cover all the possible configurations of the side chains of the resins of the present invention, for example it is also intended that the scope of the invention shall include side chains having branched configurations, and/or having ordered or random distribution of the linking and active groups and/or having more than one type of active group and/or having more than one type of linking group. It is characteristic of all the side chains that they are linked to the substrate by at least one of their constituent vinyl groups.

The function of the linking vinyl group is to provide the means whereby the active groups may be linked by a graft copolymerisation with the perhalogenated, fluorine-containing hydrocarbon polymeric material which comprises the skeletal substrate. We have found that this graft copolymerisation can be effected by radiation grafting.

This novel process of radiation graft copolymerisation of an active group and a substrate comprising a halogenated hydrocarbon polymer with a linking group is also applicable to resins comprising partly halogenated fluorine-containing hydrocarbon skeletal substrates. Such partly halogenated substrates may suitably comprise fluorinated olefin/olefin copolymers, preferably fluorinated ethylene/ethylene copolymers, and especially copolymers of tetrafluoroethylene and ethylene, or of chlorotrifluoroethylene and ethylene; an example of this copolymer is 'HALAR', the trade name for a 1:1 copolymer of chlorotrifluoroethylene and ethylene manufactured and sold by Allied Chemical Corporation.

Thus we have now found that if a first monomeric material, from which a dicarboxylic acid active group may be derived, and a second monomeric material capable of being graft copolymerised with the active group monomer and with a fluorine containing hydrocarbon polymer, are all three together subjected to a radiation grafting process, the second monomeric material will link to the polymer and the first monomer to form a cation exchange resin having a fluorine containing hydrocarbon polymeric skeletal substrate with pendant side chains containing dicarboxylic acid ion exchange groups.

Accordingly the present invention also provides a process for the preparation of a cation exchange resin comprising a fluorine containing hydrocarbon polymeric skeletal substrate with at least one active side chain containing at least one ion exchange group derived from a dicarboxylic acid or a derivative thereof in which process a mixture of a vinyl monomeric material and an active monomeric material capable of providing said ion exchange groups is subjected to irradiation in the presence of a material comprising a fluorine containing hydrocarbon polymeric skeletal substrate so that part of the said vinyl monomeric material is grafted to the said substrate and so that copolymerisation of the vinyl monomeric material and the active monomeric material takes place to form a product having at least one pendant sidechain on the said substrate.

In the process of the invention the vinyl monomeric material and the active monomeric material are mixed in proportions such that the molar ratio of the monomers present is in the range of 20:1 to 1:9 respectively. Preferably, the molar ratio is in the range of 4:1 to 1:2 and, more preferably, in order to obtain the preferred resins of this invention, the monomeric materials are mixed in approximately equimolar proportions, (ie in the range 1.1:1.0 to 1.0:1.1).

The mixture of monomeric materials has to be in a liquid form and, if necessary, a common solvent is used to prepare a solution of them. Commonly one of the monomeric materials itself will provide the liquid phase dissolving the other monomeric material. Alternatively, with advantage, the solvent used is one which will penetrate the substrate material and cause it to swell, thereby allowing the solution of monomers to be absorbed right through the substrate material. Suitable solvents are, for example, toluene and xylene. It is also within the scope of this invention for the substrate material to be pre-swelled with such solvents prior to the addition of the monomers, the advantage of this procedure being that minimum quantities of solvent are used.

Any of the known methods of radiation grafting may be employed. For example, the substrate and monomeric materials may be subjected together to continuous or intermittent radiation, or the substrate may be pre-irradiated prior to bringing it into contact with the monomeric materials. Preferably the substrate and monomeric materials are irradiated together; the substrate, which is a solid and may be in the form of fine particles or as a sheet or film, is immersed in the liquid phase containing the mixed monomeric materials and the whole subjected to irradiation by γ-rays, or X-rays, or electron beam; preferably by γ-rays.

It is essential for the process of the invention that both the linking monomeric material and the active monomeric material are present together during the grafting process so that the free radicals generated by the radiation may initiate both the grafting of linking groups to the substrate and, concurrently, the copolymerisation of the linking and active monomeric materials to form the active chains which characterise the resins of the present invention. Preferably the grafting process is carried out in the absence of oxygen.

In those cases where a derivative of the active monomer is employed in the grafting process, eg maleic anhydride, subsequent chemical treatment such as hydrolysis is required to render the dicarboxylate derivative into the active acid form.

It lies within the scope of our invention to prepare cation exchange resins by using the process of our invention whereby dicarboxylic acid-containing side chains are grafted onto a fluorine containing hydrocarbon polymeric skeletal substrate to which other active side chains, for example side chains containing sulphonic acid or monocarboxylic acid groups, are already attached. For example, the process of our invention may be applied to 'NAFION' to give a cation exchange resin having both sulphonate group-containing side chains and dicarboxylic acid group-containing side chains.

It also lies within the scope of our invention to introduce further active groups to the resins, as hereinbefore defined, comprising a substrate, linking groups and active groups. The additional active groups are introduced by chemical modification of the groups already present. Thus, for example, the linking groups in the side chains may be sulphonated and/or carboxylated to give active resins having an enhanced capacity.

Ion-exchange resins, according to the present invention, have enhanced properties particularly as regards resistance to degradation by water uptake during use. This is obviously of importance when they are used for their titular purpose, but they find particular application in the form of films as perm-selective membranes in electrolysis cells.

These membranes may be fabricated from particles of resins of the present invention, or preferably a perhalogenated fluorine-containing hydrocarbon polymeric film is made which is then subjected to the process of the present invention to form a resin of the present invention in the form of a membrane.

Accordingly, in an embodiment of the present invention, there is provided a perm-selective membrane, suitable for use in electrolysis cells, which comprises a resin having cation exchange properties, wherein the said resin is made by irradiation induced grafting of linking vinyl groups, as hereinbefore defined, to a substrate comprising a perhalogenated fluorine-containing hydrocarbon polymer and concurrently forming copolymers of vinyl groups and active groups, as hereinbefore defined, thereby forming a resin having a molecular structure consisting of a perhalogenated fluorine-containing hydrocarbon polymeric substrate with side chains of said copolymers, said side chains comprising at least one active group derived from unsaturated dicarboxylic acids or derivatives thereof and at least one vinyl group, said active groups and vinyl groups being in a molar ratio in the range of 1:1 to 1:20.

Preferably said active groups and vinyl groups are present in the side chains in a molar ratio in the range of 1:1 to 1:3.

The membranes according to this embodiment of the invention may be made by forming a film, by any known suitable film forming process, eg compression, from particles of the cation exchange resin, or alternatively and preferably the perhalogenated fluorine-containing hydrocarbon polymeric substrate material is formed first into a film. This film is then subjected to the grafting process which renders it suitable for use as a membrane in an electrolytic cell.

Such membranes have a lower water uptake and have a higher degradation resistance than conventional membranes of similar performance characteristics.

The membranes according to this invention may also be usefully employed in other electrochemical systems, for example, as separators and/or solid electrolytes in batteries, fuel cells and electrolysis cells.

The invention is now illustrated by, but not limited to, the following examples in which all ion exchange capacities are those relating to highly alkaline conditions, ie both carboxylic acid groups acting as exchange sites.

EXAMPLE 1

100 grams of commercially available "KEL-F" powder (registered Trade Mark for the homopolymer of chlorotrifluoroethylene), free of additives and having a particles size about +150 mesh, were suspended in monochlorobenzene (300 ml), containing also 10.0 g (0.096 moles) of styrene and 9.4 g (0.096 moles) of maleic anhydride, in a reaction vessel fitted with stirring means, heating means, gas inlet and outlet ports and condensing means. The suspension was subjected to gamma radiation. Before and during the gamma radiation a stream of nitrogen gas was bubbled through the contents of the vessel. The contents of the vessel were heated to 52.5° C. under continuous agitation and subjected to gamma radiation for a total of 4.5 hrs at a dose rate of 250 krad/hr. The radiated mixture received the total dose of 1125 krad, after which the radiation, heating and stirring ceased. The grafted resin powder was quantitatively transferred to a washing column and washed free from unreacted monomers, solvent and unwanted byproducts. Finally the resin was converted into the acid form and dried in vacuum oven at 60° C.

The percentage graft, which is calculated by expressing the weight increase of the resin as a percentage of the weight of grafted resin produced, was 2.25%. The ion exchange capacity was determined by titration to be 0.18 meq/g. Assuming equimolar proportions of the groups derived from the styrene and from the maleic anhydride monomers in the polymeric side chains grafted onto the "KEL-F" skeleton, the theoretical ion exchange capacity of a resin with a 2.25% graft would be 0.20 meq/g. Examination of the infra-red spectrum of the product had shown the presence of dicarboxylic acid and styrene in the molecular structure of the resin.

EXAMPLES 2 TO 5

Graft copolymers of styrene-maleic anhydride to "KEL-F" powder, according to the present invention, were made by the method described in Example 1, except that different total monomer concentrations (keeping the molar ratios of monomers constant) were used to produce various levels of grafts, resulting in various exchange capacities of the grafted product resin as shown in Table 1.

TABLE 1

| Example | 2 | 3 | 4 | 5 |
|---|---|---|---|---|
| Concentration of monomers in monochlorobenzene | | | | |
| Styrene g/l | 21.0 | 53.3 | 126.6 | 286.6 |
| Maleic anhydride g/l | 19.7 | 50.7 | 120.0 | 266.6 |
| Percentage graft % | 1.25 | 3.12 | 5.06 | 8.01 |
| Theoretical ion exchange capacity meq/g | 0.11 | 0.28 | 0.44 | 0.67 |
| Measured ion exchange capacity meq/g | 0.09 | n.d. | 0.40 | n.d. |

Infra-red analysis confirmed that presence of dicarboxylic acid and styrene in the molecular structure of the grafted resin products.

EXAMPLES 6 TO 8

These examples illustrate the products of the present invention having a different fluorine containing hydrocarbon polymer substrate to those of examples 1 to 5. In these examples styrene and maleic anhydride were graft copolymerised by the process according to the invention, using the conditions described in example 1, to "FLUON" powder, which is a homopolymer of tetrafluoroethylene ("FLUON" is a trade mark of Imperial Chemical Industries Ltd). The percentage-grafts and ion-exchange capacities of the product resins in their acid form obtained using various monomer concentrations are given in Table 2.

TABLE 2

| Example | 6 | 7 | 8 |
|---|---|---|---|
| Concentration of monomers in monochlorobenzene | | | |
| styrene g/l | 21.0 | 33.7 | 143.3 |
| maleic anhydride g/l | 19.7 | 31.7 | 135.0 |
| Percentage graft % | 0.75 | 1.22 | 3.12 |
| Theoretical ion exchange capacity meq/g | 0.06 | 0.11 | 0.28 |
| Measured ion exchange capacity meq/g | n.d. | 0.08 | n.d. |

Infra-red analysis confirmed the presence of dicarboxylic acid and styrene in the molecular structure of the grafted resin products.

EXAMPLES 9 TO 12

Treatment of samples of products from some of the previous examples by a known process for substituting sulphonate groups into the styrene groups produced sulphonated resins having ion-exchange capacities given in table 3.

TABLE 3

| Example No | Sulphonated product from | Ion-exchange capacity meq/g theoretical | measured |
|---|---|---|---|
| 9 | example 1 | 0.31 | 0.26 |
| 10 | example 2 | 0.17 | 0.13 |
| 11 | example 4 | 0.64 | 0.52 |
| 12 | example 7 | 0.17 | 0.13 |

The ion-exchange capacities of these sulphonated resins were all greater than their non-sulphonated analogues.

EXAMPLES 13 TO 18

These examples illustrate the application of the process of the present invention to the graft copolymerisation of styrene and maleic anhydride to films of fluorine containing hydrocarbon polymeric materials to give products of the invention in a form which makes them suitable for use as perm selective membranes in electrolysis cells.

The mixture of monomers dissolved in toluene in the concentrations indicated in table 4 in the presence of films of various fluorine containing polymers were subjected to a total gamma radiation dose of 1000 krad over four hours 300 ml of monomer solution were used to treat 10 g of film. The grafted films were washed to remove any residual monomers, solvent and side products and converted into the acid form. The ion-exchange capacities of the films so produced are given in table 4.

TABLE 4

| Example No | 13 | 14 | 15 | 16 | 17 | 18 |
|---|---|---|---|---|---|---|
| Substrate film material | PTFE* | "KEL-F" | "NAFION" 110 | | "NAFION" 390 | |
| Concentration of monomers in toluene | | | | | | |
| styrene g/l | 36.7 | 36.7 | 36.7 | 90.0 | 36.7 | 90.0 |
| maleic |  |  |  |  |  |  |

TABLE 4-continued

| Example No | 13 | 14 | 15 | 16 | 17 | 18 |
|---|---|---|---|---|---|---|
| anhydride g/l | 35.0 | 35.0 | 35.0 | 85.0 | 35.0 | 85.0 |
| Percentage graft % | 1.10 | 1.75 | 2.50 | 4.80 | 1.60 | 4.10 |
| Theoretical ion exchange capacity meq/g | 0.09 | 0.16 | 1.02 | 1.22 | 0.75 | 0.97 |

*PTFE = poly-(tetrafluoroethylene)

The "NAFION" 110 and "NAFION" 390 films, which are known perm-selective membranes, used as substrates had ion-exchange capacities of 0.79 meq/g and 0.60 meq/g respectively. In all cases the addition of further active side chains by graft copolymerisation with styrene and maleic anhydride monomers improved the ion-exchange capacities of the "NAFION" films used.

EXAMPLES 19 TO 24

Samples of the grafted films prepared in examples 13 to 18 were sulphonated, thereby further enhancing their ion-exchange capacities as indicated in table 5.

TABLE 5

| Example No | Sulphonated product from | Ion-exchange capacity meq/g | |
|---|---|---|---|
| | | theoretical | measured |
| 19 | example 13 | 0.15 | 0.11 |
| 20 | example 14 | 0.25 | 0.19 |
| 21 | example 15 | 1.13 | 1.05 |
| 22 | example 16 | 1.43 | 1.31 |
| 23 | example 17 | 0.82 | 0.78 |
| 24 | example 18 | 1.15 | 1.01 |

EXAMPLE 25

100 grams of "KEL-F" powder similar to that used in Example 1 were suspended in 300 ml of a solution of maleic anhydride and tetrafluoroethylene in toluene. The solution contained 0.7 g/kg of maleic anhydride and 0.7 g/kg of tetrafluoroethylene.

The suspension was frozen by immersing its container in liquid nitrogen. It was degassed and allowed to regain room temperature. The degassing procedure was repeated three times and the container sealed.

The solution in the sealed container was heated to 70° C. and held at that temperature for 24 hours. The container and its contents were subjected to γ-radiation for a total of 50 hours at a dose rate of 100 krad/hr.

After irradiation the container was again immersed in liquid nitrogen, a necessary precaution with tetrafluoroethylene, to freeze the suspension before the container was opened. The powder was washed free of unreacted monomers and ungrafted homopolymer. It was found that 20% graft had taken place. The powder was pressed to form a membrane which was then hydrolysed. The ion exchange capacity of the hydrolysed membrane was determined to be 0.64 meq/g. On the basis of the percentage graft and the ion exchange capacity it was calculated that the molar ratio of active to vinyl groups in the side chains grafted on the "KEL-F" substrate was approximately 1:3.

EXAMPLE 26

In this example, the advantage of using a swelling solvent is demonstrated.

4 grams of "KEL-F" powder similar to that used in Example 1 were immersed in hot xylene. The powder swelled and absorbed an amount of xylene equal to approximately 7% of its own weight. Excess xylene was removed. An equimolar mixture of styrene and maleic anhydride was added to the swollen powder. After 12 hours the excess liquid phase was decanted off and the swollen powder with absorbed monomers was irradiated under nitrogen with radiation at a level of 80 krad/hour for 24 hours.

After removal of any homopolymer formed and of any unreacted monomers, the powder was hydrolysed. The ion exchange capacity of the resin was determined to be 1.1 meq/g.

A portion of the resin was pressed into a film and hydrolysed in 30% w/w sodium hydroxide solution overnight. The film was then placed in a small jacketed electrolytic cell fitted with platinum electrodes. The anode side of the cell was filled with concentrated sodium chloride brine and the cathode side with 30% w/w sodium hydroxide solution. Electrolysis at 90° C. and a current density of 1.6 kA/m$^2$ produced chlorine at the anode and hydrogen and sodium hydroxide at the cathode.

EXAMPLE 27

A piece of film consisting of a copolymer of tetrafluoroethylene and hexafluoropropylene (FEP) (250 microns thick, 2.8 g) was soaked in a solution of maleic anhydride (20 g), styrene (250 g) and carbon tetrachloride (250 g) with quinol (2.0 g). The mixture was heated at 60° C. for 4 hrs, then irradiated at room temperature for 10 hrs at a dose-rate of 100 krad/hr. After irradiation the contents were kept at 60° C. for another 6 hours with vigorous stirring. Then the film was taken out and washed free of unreacted monomers and copolymers and dried to constant weight. By the weight increase it was calculated that there had been a 12% graft.

The treated FEP film was hydrolysed in 30% w/w sodium hydroxide solution at 90° C. for 60 hrs and the ion exchange capacity was determined to be 0.85 meq/g from which it was calculated that the molar ratio of groups derived from maleic anhydride and from styrene was 2:3.

The film was tested in a small electrolytic cell in the manner described in example 26. The current efficiency determined by measuring the chlorine evolved was found to be 76% (weight of chlorine evolved expressed as a percentage of the theoretical weight of chlorine equivalent to the current passed) which compares favourably with that obtained using a 'NAFION' membrane under the same conditions which was 50%.

We claim:

1. A cation exchange resin comprising a perhalogenated fluorine-containing hydrocarbon polymeric skeletal substrate to which has been radiation cografted a mixture of monomers comprising at least one active monomer containing a dicarboxylic acid group or derivative thereof and at least one linking monomer containing a vinyl group and wherein the mixture of monomers is dissolved in a hydrophobic solvent which will penetrate and swell the substrate and the molar ratio of active groups to vinyl groups in the cografted substrate is in the range of 1:1 to 1:20.

2. A cation exchange resin according to claim 1 wherein the molar ratio of the active groups to the vinyl groups is in the range 1:1 to 1:3.

3. A cation exchange resin according to claim 1 wherein the perhalogenated fluorine-containing hydrocarbon polymeric substrate is perfluorinated.

4. A cation exchange resin according to claim 3 wherein the perhalogenated fluorine-containing hydrocarbon polymeric substrate is poly-(tetrafluoroethylene).

5. A cation exchange resin according to claim 1 wherein the perhalogenated fluorine-containing hydrocarbon polymeric substrate also contains chlorine.

6. A cation exchange resin according to claim 5 wherein the perhalogenated fluorine-containing hydrocarbon polymeric substrate is a homopolymer of chlorotrifluoroethylene.

7. A cation exchange resin according to claim 1 wherein the active group is a dicarboxylic acid, or a derivative thereof group, having a general formula represented by

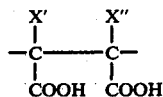

where X' and X" are independently selected from the group consisting of hydrogen, fluorine, chlorine, an alkyl group and a halogenated alkyl group.

8. A cation exchange resin according to claim 1 wherein the active group is

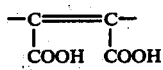

9. A cation exchange resin according to claim 1 wherein the said vinyl group is derived from an aliphatic vinyl monomer.

10. A cation exchange resin according to claim 9 wherein the vinyl group is derived from a monomer selected from the group of monomers having the general formula a $$CX_2=CXY$$

where X is hydrogen or fluorine; and Y is hydrogen, fluorine or chlorine.

11. A cation exchange resin according to claim 10 wherein the vinyl group is derived from tetrafluoroethylene.

12. A cation exchange resin according to claim 1 wherein the said vinyl group is derived from an aromatic vinyl monomer.

13. A cation exchange resin according to claim 12 wherein the vinyl group is derived from a monomer selected from the group of monomers having the general formula of

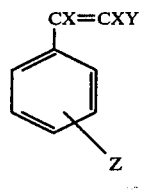

where
X is hydrogen or fluorine
Y is hydrogen or fluorine or chlorine
Z is hydrogen, alkyl, alkene, halogenated alkyl or halogenated alkene group.

14. A process according to claim 1 wherein the molecular ratio of linking monomer to active monomer is in the range of 4:1 to 1:2.

15. A process according to claim 1 wherein the molar ratio of monomers is in the range of 1.1:1.0 to 1.0:1.1.

16. A process according to claim 1 wherein the material comprising the said substrate and the said mixture of monomers are subjected together to irradiation by any one form of radiation selected from the group consisting of γ-rays, X-rays and electron beams.

17. A process according to claim 1 wherein the said fluorine-containing hydrocarbon polymeric skeletal substrate is perhalogenated.

18. A process according to claim 1 wherein the said substrate is a fluorinated olefin/olefin copolymer.

19. A process according to claim 1 wherein the said substrate is a copolymer of ethylene and a fluorinated olefin selected from the group of fluorinated ethylenes consisting of tetrafluoroethylene and chlorotrifluoroethylene.

20. A perm-selective membrane, suitable for use in electrolysis cells, which comprises a cation exchange resin according to claim 1.

21. A process of making a perm-selective membrane according to claim 20, in which process the said cation exchange resin is subjected to compression so as to form it into a thin membrane.

22. A process of making a perm-selective membrane according to claim 20, in which process a film comprising a perhalogenated fluorine-containing hydrocarbon polymeric substrate is impregnated with said mixture of monomers and said impregnated film is then subjected to irradiation so that the monomers in the said mixture are graft copolymerised to the said substrate to form active side chains on the said substrate.

23. A cation exchange resin according to claim 1 wherein the said hydrophobic solvent is selected from the group consisting of toluene, xylene, monochlorobenzene and carbon tetrachloride.

24. A cation exchange resin according to claim 1 wherein the radiation is by any one form selected from the group consisting of γ-rays, X-rays and electron beams.

25. A process of preparing a cation exchange resin of claim 1 which process comprises irradiation of a mixture of the said perhalogenated fluorine-containing hydrocarbon polymeric skeletal substrate and a solution of the said mixture of monomers in the said hydrophobic solvent and wherein the molar ratio of the active monomer to the linking monomer is in the range of 9:1 to 1:20.

* * * * *